US011916327B2

(12) United States Patent
Ziegler et al.

(10) Patent No.: US 11,916,327 B2
(45) Date of Patent: Feb. 27, 2024

(54) SPACE-OPTIMIZED CABLE CONNECTOR INTERFACE

(71) Applicant: Dell Products L.P., Round Rock, TX (US)

(72) Inventors: Charlie W. Ziegler, Framingham, MA (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/398,298

(22) Filed: Aug. 10, 2021

(65) Prior Publication Data

US 2023/0047539 A1 Feb. 16, 2023

(51) Int. Cl.
*H01R 13/04* (2006.01)
*H01R 24/64* (2011.01)

(52) U.S. Cl.
CPC ............. *H01R 13/04* (2013.01); *H01R 24/64* (2013.01); *H01R 2201/04* (2013.01); *H01R 2201/06* (2013.01)

(58) Field of Classification Search
CPC ..... H01R 13/04; H01R 24/64; H01R 2201/06
USPC ............................................................ 439/660
See application file for complete search history.

(56) References Cited

U.S. PATENT DOCUMENTS 11,050,198 B1 * 6/2021 Cheng .................. H01R 13/665
2004/0224539 A1 * 11/2004 Boyd ..................... H01R 24/64 439/39
2006/0046580 A1 * 3/2006 Ankerstjerne ....... H01R 13/465 439/713
2007/0296420 A1 * 12/2007 King .................... H01R 13/641 324/754.14
2008/0222312 A1 * 9/2008 Simanonis ............ G06F 13/409 710/10
2010/0317216 A1 * 12/2010 Pocrass .................. H01R 24/60 439/490
2012/0178282 A1 * 7/2012 Engels ................. H01R 4/2433 29/874
2012/0269484 A1 * 10/2012 Peto ....................... H01R 24/60 385/76
2016/0036178 A1 * 2/2016 Riccardi ................ H01R 12/62 439/620.23
2017/0343762 A1 * 11/2017 Torres ...................... G02B 6/46
2019/0214766 A1 * 7/2019 Murray ................ H01R 13/639
2020/0176932 A1 * 6/2020 Anderson .......... H01R 13/6463
2022/0115807 A1 * 4/2022 Anderson ............ H01R 43/048
2022/0140546 A1 * 5/2022 Kupec .................. H01R 13/665 439/490

* cited by examiner

*Primary Examiner* — Alexander Gilman
(74) *Attorney, Agent, or Firm* — Jackson Walker L.L.P.

(57) ABSTRACT

A cable assembly may include a cable having a plurality of electrically-conductive wires including a first set of wires and a second set of wires and a plug terminating an end of the cable, the plug comprising a housing including a locking tab formed on the outside of the housing on a first side of the housing and configured to mechanically couple the plug to a corresponding receptacle connector, a first contact formed on the first side of the housing and configured to expose the first set of wires to a first set of pins of the corresponding receptacle connector, and a second contact formed on a second side of the housing opposite the first side and configured to expose the second set of wires to a second set of pins of the corresponding receptacle connector.

8 Claims, 3 Drawing Sheets

SPACE-OPTIMIZED CABLE CONNECTOR INTERFACE

TECHNICAL FIELD

The present disclosure relates in general to information handling systems, and more particularly to systems and methods for providing a cable connector interface that optimizes height and width on a faceplate or chassis wall of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Cable connector interfaces often play a critical role within most electrically- and mechanically-oriented information handling system designs. There are often many critical parameters that any electrical and/or mechanical designer must take into consideration when choosing a connector interface. One such parameter is the amount of space a connector takes up at an air dam on a faceplate or chassis wall of an information handling system enclosure.

An 8-pin/8-connector (8P8C) plug and connector (which are often referred to as a Registered Jack-45 (RJ-45) plug and connector), are widely leveraged for use in coupling communications cables to information handling systems. However, a traditional 8P8C connector often presents challenges with respect to optimizing space in an air dam, chassis wall, and/or faceplate of the information handling system.

An information handling system may have a limited amount of chassis wall space for connectors, and thus features in an information handling system are often sacrificed or minimized simply because of insufficient chassis wall space to support such features.

Dual-stack 8P8C connectors do exist, but they are often too tall, for example, much too tall to fit in a typical Open Computer Project (OCP) Network Interface Card (NIC) 3.0 or Datacenter-ready Secure Control Module (DC-SCM) 1.0 card form factor height. Thus, an information handling system designer may sacrifice thermals, other connectors, and/or chassis-wall/faceplate space to fit 8P8C connectors side by side.

As the electronics industry continues to progress to smaller enclosures with increasingly dense designs while still increasing overall connectivity, a solution that can increase communications connectivity within the same height and width of existing single-port implementations may prove valuable to the industry.

SUMMARY

In accordance with the teachings of the present disclosure, the disadvantages and problems associated with traditional approaches to networked connectivity may be reduced or eliminated.

In accordance with embodiments of the present disclosure, a cable assembly may include a cable having a plurality of electrically-conductive wires including a first set of wires and a second set of wires and a plug terminating an end of the cable, the plug comprising a housing including a locking tab formed on the outside of the housing on a first side of the housing and configured to mechanically couple the plug to a corresponding receptacle connector, a first contact formed on the first side of the housing and configured to expose the first set of wires to a first set of pins of the corresponding receptacle connector, and a second contact formed on a second side of the housing opposite the first side and configured to expose the second set of wires to a second set of pins of the corresponding receptacle connector.

In accordance with these and other embodiments of the present disclosure, a plug for terminating an end of a cable having a plurality of electrically-conductive wires including a first set of wires and a second set of wires is provided, the plug comprising a housing including a locking tab formed on the outside of the housing on a first side of the housing and configured to mechanically couple the plug to a corresponding receptacle connector, a first contact formed on the first side of the housing and configured to expose the first set of wires to a first set of pins of the corresponding receptacle connector, and a second contact formed on a second side of the housing opposite the first side and configured to expose the second set of wires to a second set of pins of the corresponding receptacle connector.

In accordance with these and other embodiments of the present disclosure, a receptacle connector may include a housing including a mechanical feature configured to mechanically engage with a locking tab formed on a first side of a plug housing of a plug in order to mechanically retain the plug within the receptacle connector, a first set of pins configured to electrically couple to a first contact formed on the first side of the plug housing, and a second set of pins configured to electrically couple to a second contact formed on a second side of the plug housing opposite to the first side.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
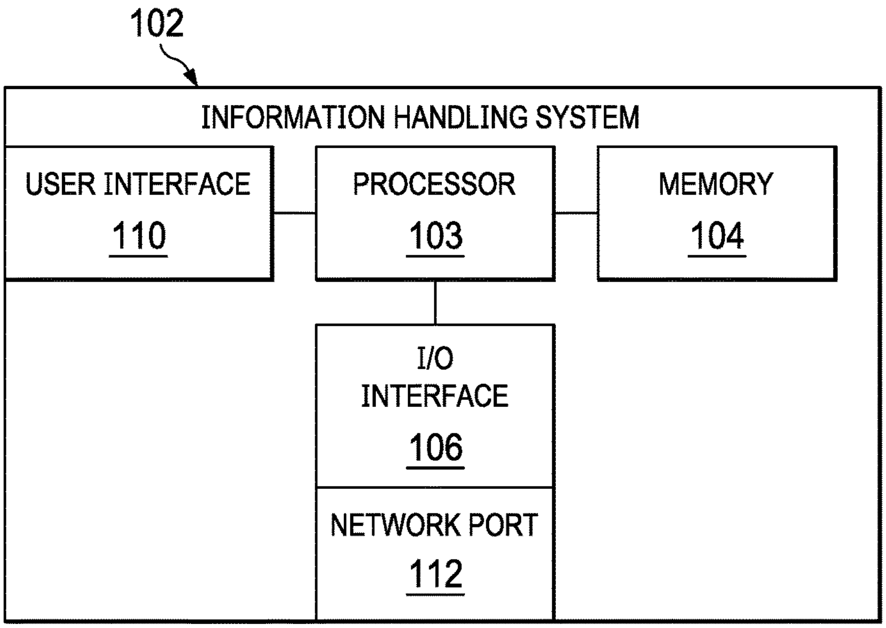
FIG. 1 illustrates a block diagram of selected components of an example information handling system, in accordance with embodiments of the present disclosure.

FIG. 1 illustrates a block diagram of selected components of an example information handling system 102, in accordance with embodiments of the present disclosure. In some embodiments, information handling system 102 may be a personal computer (e.g., a desktop computer or a portable computer). In other embodiments, information handling system 102 may comprise a storage server for archiving data. In yet other embodiments, information handling system 102 may comprise a server. In further embodiments, information handling system 102 may comprise a network switch.

As depicted in FIG. 1, information handling system 102 may include a processor 103, a memory 104 communicatively coupled to processor 103, an input/output (I/O) interface 106 communicatively coupled to processor 103, a user interface 110 communicatively coupled to processor 103, and a network port 112 communicatively coupled to I/O interface 106.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

I/O interface 106 may comprise any suitable system, apparatus, or device operable to serve as an interface between information handling system 102 and one or more other external devices. For example, in some embodiments, I/O interface 106 may comprise a network interface configured to serve as an interface between information handling system 102 and other information handling systems via a network, in which case I/O interface 106 may comprise a network interface card, or "NIC."

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

Network port 112 may comprise an electrical connector in the form of any suitable combination of a jack, a socket, and/or a "cage" for receiving a corresponding connector (e.g., an 8 position 8 contact (8P8C) cable termination) of a cable assembly (e.g., a Category 5 or a Category 6 cable). As described in greater detail below, in some embodiments, network port 112 may comprise an enhanced double-density receptacle connector for receiving a corresponding enhanced double-density plug terminating an enhanced double-density cable.

In addition to processor 103, memory 104, I/O interface 106, user interface 110, and network port 112, information handling system 102 may include one or more other information handling resources. Such an information handling resource may include any component system, device, or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2A:
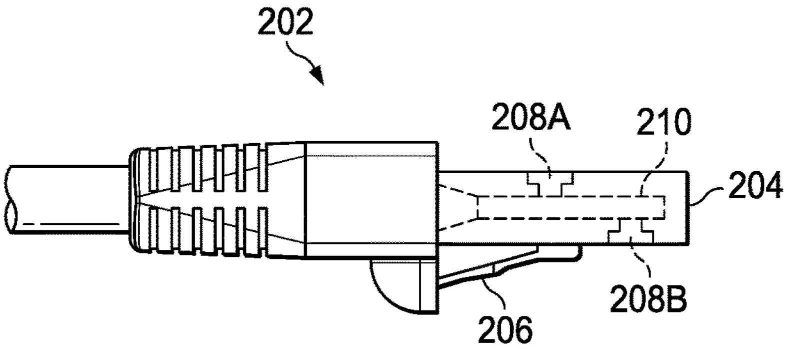
FIG. 2A illustrates a side elevation view of an enhanced double density plug for use with an enhanced double density cable assembly, in accordance with embodiments of the present disclosure.

FIG. 2A illustrates a side elevation view of an enhanced double density plug 202 for use with an enhanced double density cable assembly, in accordance with embodiments of the present disclosure. As shown in FIG. 2A, enhanced double density plug 202 may include a housing 204 and a locking tab 206 formed on the outside thereof for mechanically coupling enhanced double density plug 202 to a corresponding enhanced double density receptacle connector. Housing 204 and locking tab 206 may be formed from any suitable material, including plastic. Housing 204 and locking tab 206 may otherwise be similar to analogous features present on traditional single-density cable plugs, such as those analogous features present on traditional 8P8C/RJ-45 plugs, although housing 204 may be longer in length than housings of traditional single-density cable plugs.

As also shown in FIG. 2A, housing 204 may house an insulation displacing contact 208A on a side of housing 204 opposite that of locking tab 206. In addition, housing 204 may house an insulation displacing contact 208B on the same side of housing 204 as locking tab 206. Further, housing 204 may house the ends of a plurality of wires 210, and the ends of such wires 210 may be exposed to the exterior of housing 204 via insulation displacing contact 208A and insulation displacing contact 208B. Insulation displacing contact 208A may be identical or similar in many respects to analogous features present on traditional 8P8C/RJ-45 plugs. Insulation displacing contact 208B may be similar in many respects to insulation displacing contact 208A except that insulation displacing contact 208A is on a side of housing 204 opposite to that of insulation displacing contact 208B and that insulation displacing contact 208A may be electrically coupled to a first set of the wires 210 and insulation displacing contact 208B may be electrically coupled to a different, second set of the wires 210.

Figure 2B:
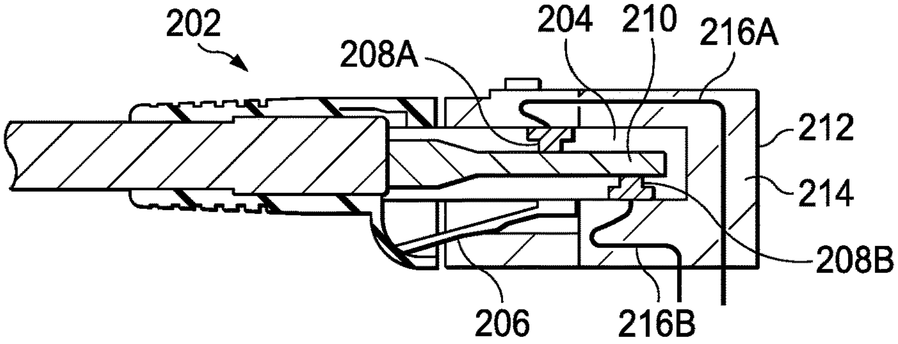
FIG. 2B illustrates a side elevation view of an enhanced double density receptacle connector with an enhanced double density plug received therein, in accordance with embodiments of the present disclosure.

FIG. 2B illustrates a side elevation view of an enhanced double density receptacle connector 212 with enhanced double density plug 202 received therein, in accordance with embodiments of the present disclosure. As shown in FIG. 2B, enhanced double density receptacle connector 212 may have a housing 214 comprising a first set of contacts 216A and a second set of contacts 216B. Each of the contacts of the first set of contacts 216A and the second set of contacts 216B may have a spring force configured to ensure mechanical and electrical coupling of each of the contacts to a corresponding wire exposed through one of insulation displacing contact 208A or insulation displacing contact 208B. As shown in FIG. 2B, when enhanced double density plug 202 is inserted into enhanced double density receptacle connector 212, contacts of first set of contacts 216A may electrically and mechanically couple to wires exposed through insulation displacing contact 208A and contacts of second set of contacts 216B may electrically and mechanically couple to wires exposed through insulation displacing contact 208B. Further, when enhanced double density plug 202 is inserted into enhanced double density receptacle connector 212, locking tab 206 may engage with a corresponding feature of into enhanced double density receptacle connector 212 in order to mechanically retain enhanced double density plug 202 within enhanced double density receptacle connector 212.

Figure 3:
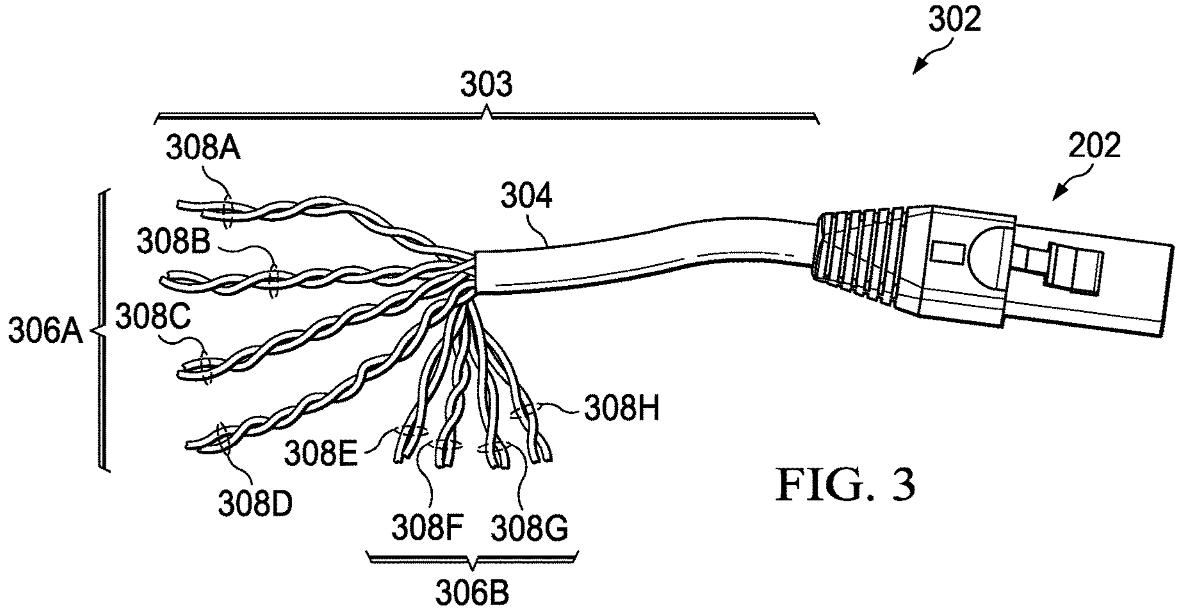
FIG. 3 illustrates an enhanced double density cable assembly, in accordance with embodiments of the present disclosure.

FIG. 3 illustrates an enhanced double density cable assembly 302, in accordance with embodiments of the present disclosure. As shown in FIG. 3, enhanced double density cable assembly 302 may include a cable 303 electrically terminated with enhanced double density plug 202. As also shown in FIG. 3, cable 303 may comprise an electrically-insulating cable jacket 304 enclosing a plurality of wires. Wires within cable 303 may comprise a first set of wires 306A, the ends of which are exposed through insulation displacing contact 208A of enhanced double density plug 202 and a second set of wires 306B the ends of which are exposed through insulation displacing contact 208B of enhanced double density plug 202. In the case of a Category 5- or Category 6-type cable or similar cable, first set of wires 306A may include a plurality of twisted cable pairs 308A, 308B, 308C, and 308D and second set of wires 306B may include a plurality of twisted cable pairs 308E, 308F, 308G, and 308H.

Advantageously, enhanced double density receptacle connector 212 and enhanced double density plug 202 may allow for an extra set of communications channels through a cable assembly 302, with little or no impact on required space on a chassis wall to support enhanced double density receptacle connector 212 and enhanced double density plug 202 as compared with existing approaches, as enhanced double density receptacle connector 212 may have a height and width substantially similar to that of traditional receptacle connector implementations. With such a solution, enhanced double density receptacle connector 212 may "gain" another set of communications channels without requiring additional air dam space that would otherwise be required by another traditional network port. As a result, connectivity density may be improved (e.g., by 2×) over that of traditional approaches, and may increase airflow and/or available features over that of traditional approaches.

Further, enhanced double density receptacle connector 212 may remain backwards compatible with traditional cable assemblies and traditional cable plugs. In practice, one could plug a traditional plug into enhanced double density receptacle connector 212, in which case one of first set of contacts 216A and second set of contacts 216B may remain unused.

Figure 4:
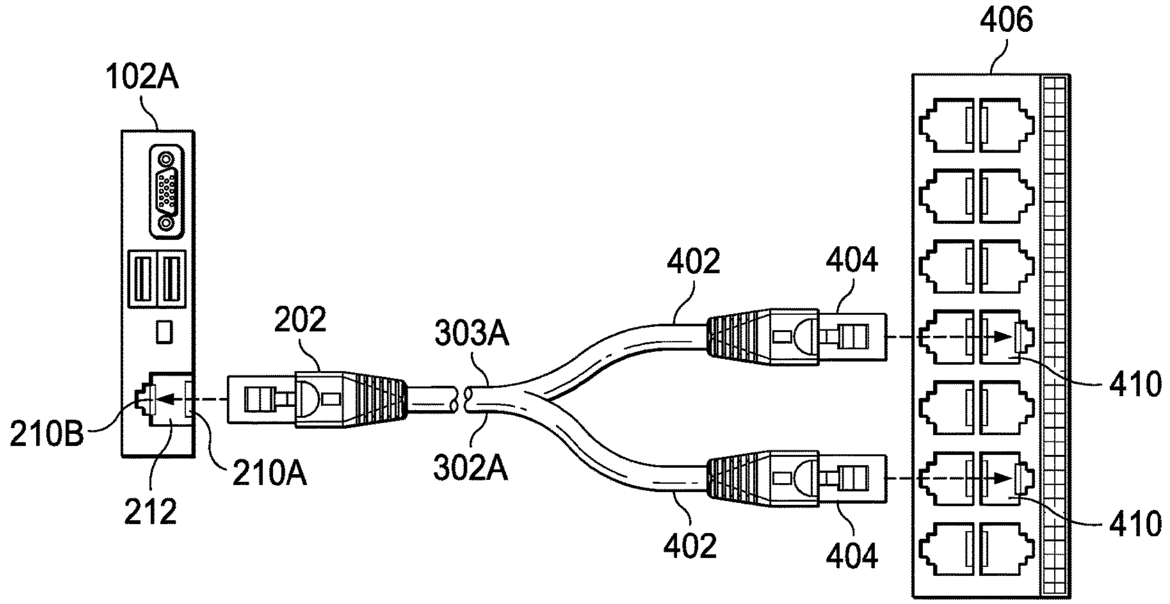
FIG. 4 illustrates a hybrid enhanced double density cable assembly and an application for use thereof, in accordance with embodiments of the present disclosure.

FIG. 4 illustrates a hybrid enhanced double density cable assembly 302A and an application for use thereof, in accordance with embodiments of the present disclosure. As shown in FIG. 4, hybrid enhanced double density cable assembly 302A may comprise a cable 303A with first set of wires 306A and second set of wires 306B terminated into enhanced double density plug 202 at one end of cable 303A, and wherein cable 303A is split into two branches 402, with one branch 402 including first set of wires 306A and the other branch including second set of wires 306B. First set of wires 306A within the first branch 402 may be terminated into a traditional plug 404 and second set of wires 306B within the second branch 402 may be terminated into another traditional plug 404. At one end of hybrid enhanced double density cable assembly 302A, enhanced double density plug 202 may be received by an enhanced double density receptacle connector 212 (e.g., at information handling system 102A) and at the other end of hybrid enhanced double density cable assembly 302A, one or both of traditional plugs 404 may be received by respective traditional receptacle connectors 410 (e.g., at switch 406).

Figure 5:
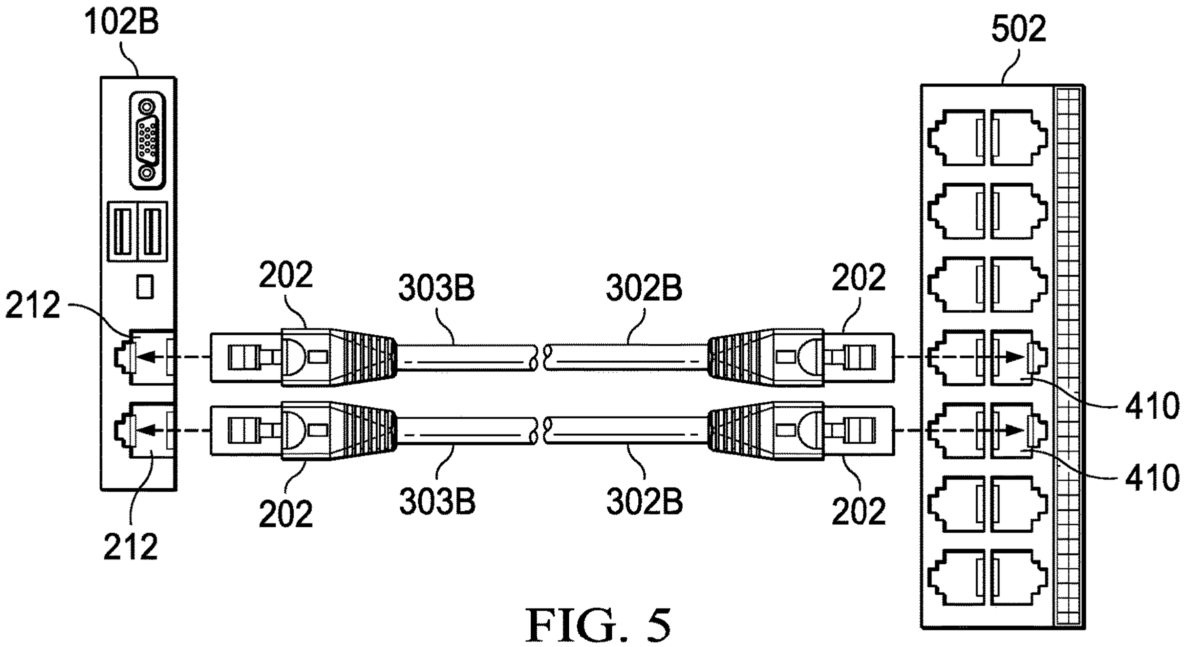
FIG. 5 illustrates two enhanced double density cable assemblies and an application for use thereof, in accordance with embodiments of the present disclosure.

FIG. 5 illustrates two enhanced double density cable assemblies 302B and an application for use thereof, in accordance with embodiments of the present disclosure. As shown in FIG. 5, an enhanced double density cable assembly 302B may comprise a cable 303B terminated into an enhanced double density plug 202 at each end of cable 303B. At one end of enhanced double density cable assembly 302B, an enhanced double density plug 202 may be received by an enhanced double density receptacle connector 212 (e.g., at information handling system 102B) and at the other end of enhanced double density cable assembly 302B, an enhanced double density plug 202 may be received by an enhanced double density receptacle connector 212 (e.g., at switch 502).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A cable assembly, comprising:

a cable having a plurality of electrically-conductive wires including a first set of wires and a second set of wires;

a double density plug terminating a first end of the cable, the double density plug comprising a housing including:

a locking tab formed on the outside of the housing on a first side of the housing and configured to mechanically couple the double density plug to a corresponding receptacle connector;

a first insulation displacing contact formed on the first side of the housing and configured to expose the first set of wires to a first set of pins of the corresponding receptacle connector;

a second insulation displacing contact formed on a second side of the housing opposite the first side and configured to expose the second set of wires to a second set of pins of the corresponding receptacle connector;

a first coupling contact configured to provide a spring force ensuring mechanical and electrical coupling to the first insulation displacing contact; and a second coupling contact configured to provide a spring force ensuring mechanical and electrical coupling to second first insulation displacing contact;

a first branch plug terminating a first branch of the cable, wherein the first branch includes the first set of wires and not the second set of wires; and a second branch plug terminating a second branch of the cable, wherein the second branch includes the second set of wires and not the first set of wires.

2. The cable assembly of claim 1, wherein:

the first set of wires comprises a first plurality of twisted pairs of wires; and the second set of wires comprises a second plurality of twisted pairs of wires.

3. The cable assembly of claim 1, wherein the double density plug has a height and a width substantially similar to at least one of the first branch plug and the second branch plug.

4. The cable assembly of claim 1, wherein the double density plug has a height and a width substantially similar to a height and width of a form factor for an 8-pin/8-connector plug.

5. A cable assembly, comprising:

a cable comprising:

a first branch including a first set of wires;

a second branch including a second set of wires; and a main branch, including the first set of wires and the second set of wires; and a double density plug terminating a free end of the main branch, the double density plug comprising a housing including:

a locking tab formed on the outside of the housing on a first side of the housing and configured to mechanically couple the double density plug to a corresponding receptacle connector;

a first insulation displacing contact formed on the first side of the housing and configured to expose the first set of wires to a first set of pins of the corresponding receptacle connector;

a second insulation displacing contact formed on a second side of the housing opposite the first side and configured to expose the second set of wires to a second set of pins of the corresponding receptacle connector;

a first coupling contact configured to provide a spring force ensuring mechanical and electrical coupling to the first insulation displacing contact; and a second coupling contact configured to provide a spring force ensuring mechanical and electrical coupling to second first insulation displacing contact.

6. The cable assembly of claim 5, wherein:

the first set of wires comprises a first plurality of twisted pairs of wires; and the second set of wires comprises a second plurality of twisted pairs of wires.

7. The cable assembly of claim 5, wherein the double density plug has a height and a width substantially similar to that of a traditional plug having only a single contact formed on the housing.

8. The cable assembly of claim 5, wherein the double density plug has a height and a width substantially similar to a height and width of a form factor for an 8-pin/8-connector plug.

* * * * *